United States Patent [19]

Morrill et al.

[11] 4,371,291
[45] Feb. 1, 1983

[54] UNDERWATER FLOWLINE CONNECTOR

[75] Inventors: Charles D. Morrill, Bellaire, Tex.; John M. Des Lierres, Rolling Hills; Louis E. Copeland, Garden Grove, both of Calif.

[73] Assignee: Smith International, Inc., Newport Beach, Calif.

[21] Appl. No.: 158,933

[22] Filed: Jun. 12, 1980

Related U.S. Application Data

[63] Continuation-in-part of Ser. No. 973,619, Dec. 27, 1978, Pat. No. 4,329,085.

[51] Int. Cl.³ .............................................. E21B 43/01
[52] U.S. Cl. ..................................... 405/169; 166/343
[58] Field of Search ........................ 405/168, 169, 170; 166/341–343, 338–342; 285/18, 24, 27

[56] References Cited

U.S. PATENT DOCUMENTS

| | | | |
|---|---|---|---|
| 3,308,881 | 3/1967 | Chan et al. | 166/344 |
| 3,591,204 | 7/1971 | Shipes | 166/340 X |
| 3,721,294 | 3/1973 | Nelson | 166/342 |
| 3,732,923 | 5/0973 | Fowler | 166/340 |
| 3,973,625 | 8/1976 | Baugh | 285/421 X |
| 4,086,778 | 5/1978 | Latham et al. | 166/343 X |
| 4,161,367 | 7/1979 | Cuiper et al. | 405/169 |
| 4,191,256 | 3/1980 | Croy et al. | 166/343 |

*Primary Examiner*—Dennis L. Taylor
*Attorney, Agent, or Firm*—Ned L. Conley; David Alan Rose; William E. Shull

[57] ABSTRACT

The underwater flowline connector includes a cable puller, cable cutter, alignment device, and flowline bundle for remotely pulling and aligning an outboard hub with a subsea inboard hub disposed on an underwater unit. The cable puller is located atop the underwater unit and includes a plurality of hydraulic cable grippers alternatingly engaging and releasing the pull-in cable connected to the flowline bundle to pull the bundle with outboard hub to the underwater unit. Pulling by the cable puller cntinues until the flowline bundle has reached the porch of the underwater unit. During its final ascent along a ramp of the porch, the flowline bundle rights itself because of a self-righting moment on the bundle caused by attaching the cable above the center of gravity of the flowline bundle. The flowline bundle is attached to the alignment device using a universal joint. The alignment device has central hydraulic extension cylinder mounted on the universal joint to engage and lock the flowline bundle. Another hydraulic cylinder, operating on a rack and pin gear assembly, is used for rotating the flowline bundle, in either direction for vertical alignment on the unit. The lateral extension cylinder retracts the universal joint causing the backplate of the flowline bundle to abut the aligment device, thus aligning the faces of the inboard and the outboard hubs parallel to one another. The lateral extension cylinder on the alignment device is also used for final lateral alignment of the outboard hub with the inboard hub. Once pull-in and alignment is completed, a hydraulic cable cutter mounted beneath the cable puller is actuated to sever the flowline pulling cable.

36 Claims, 9 Drawing Figures

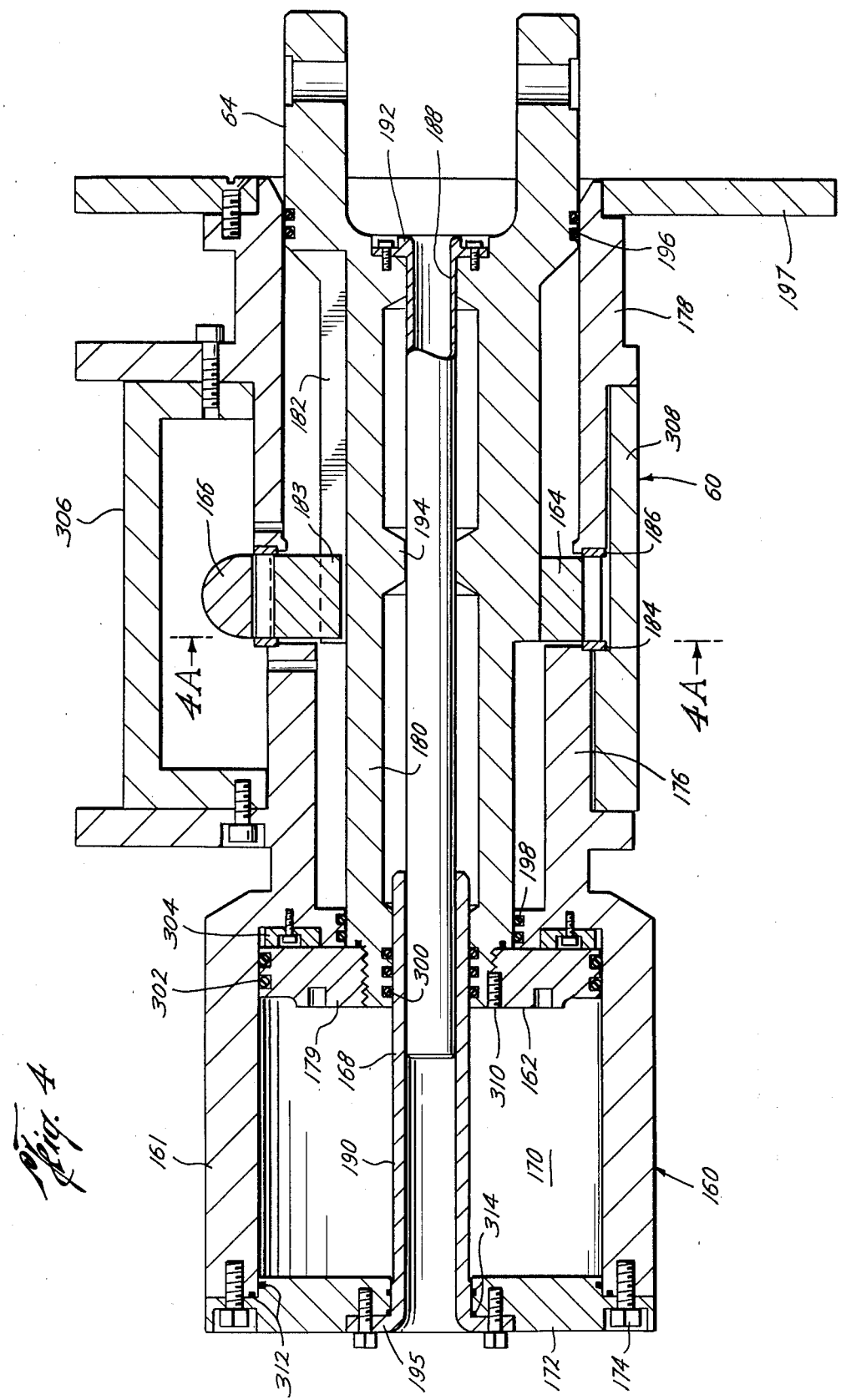

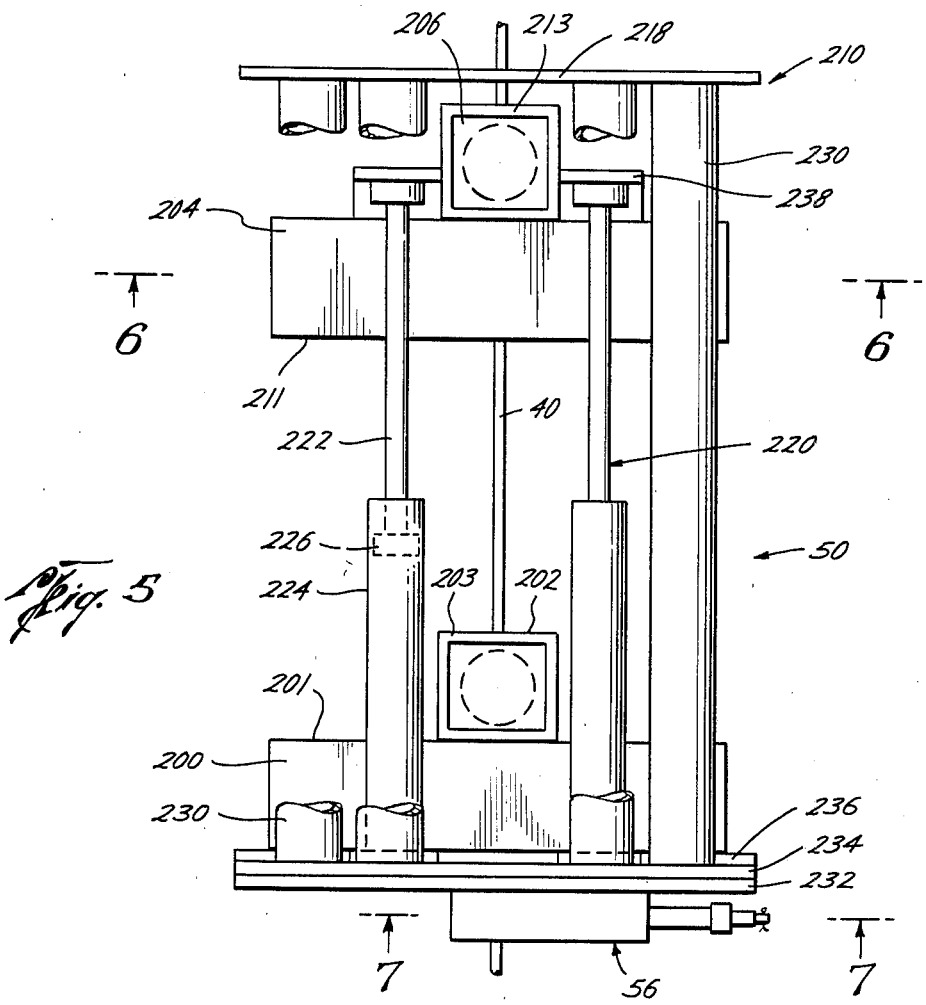
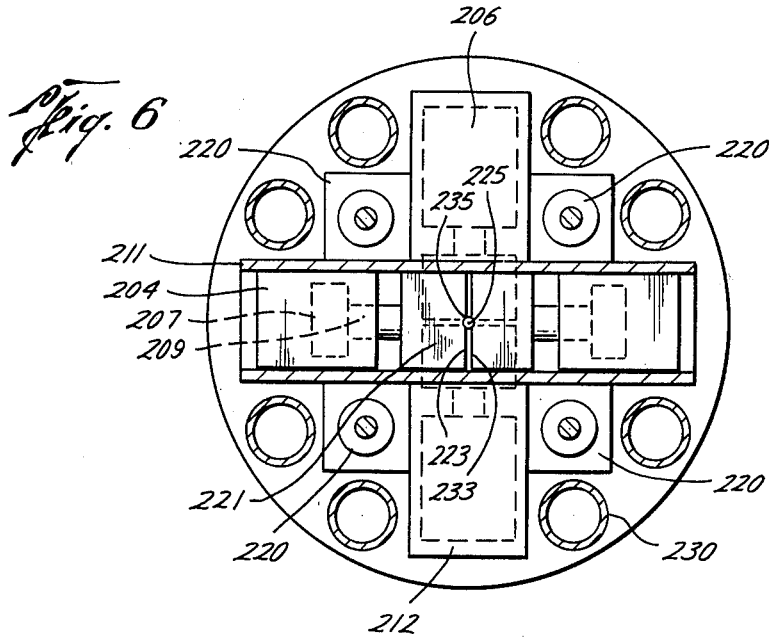

4,371,291

UNDERWATER FLOWLINE CONNECTOR

REFERENCE TO RELATED APPLICATIONS

This application is a continuation-in-part application of U.S. Application Ser. No. 973,619 filed Dec. 27, 1978 and now U.S. Pat. No. 4,329,085.

TECHNICAL FIELD

This invention relates to flowline and hydraulic control line connections and more particularly, to underwater pull-in and alignment devices for remotely pulling, aligning and connecting two or more flowlines and hydraulic control lines together.

BACKGROUND ART

Originally offshore oil and gas wells were completed on platforms resting on the ocean bottom, or were completed on the bottom with surface production facilities installed on the platform. Oil and gas produced at such platforms were either collected by tankers or by flowlines laid on the bottom. To the extent that underwater work was required, it was performed by divers, submarines, or simple manipulations from the surface.

More recently it has become necessary to drill oil and gas wells in water which is too deep or dangerous for convenient underwater operations by divers or for platforms to stand on the bottom. In such situations new oil field drilling and production techniques located on the ocean floor have been developed including multi-well subsea production manifolds and satellite well production systems. Multi-well subsea production manifolds collect oil and gas from multiple production units in the manifold for transportation to the surface. Satellite well production systems include multiple subsea satellite Christmas tree assemblies which transport the produced oil or gas to a central production location for transport to the surface. Thus, it has become necessary to devise methods of connecting such multiwell subsea production manifolds and satellite well production systems at the ocean floor with flowlines, hydraulic control lines and electrical cables extending to the surface without the use of divers or any permanent surface structure adjacent the underwater production system. In the case of multi-well subsea production manifolds, often there are a plurality of hub assemblies disposed on the manifold structure for connection to flowlines, hydraulic control lines and electrical cables. In the case of a satellite well production system, the production tree will also include numerous hub assemblies for connection to flowlines, hydraulic control lines and electrical cables extending to a central manifold or directly to the surface. A better understanding of the problems presented by such systems may be obtained by reference to the January, 1978 issue of Offshore Services magazine, published by Spearhead Publications Limited, at pages 26–51.

In making up a remote flowline connection there are two basic modes, the layaway mode and the pull-in connection mode. In the layaway mode a flowline bundle containing an outboard hub mounted on the free end of the flowline, complete with production lines, electrical cable, and multiple hydraulic lines, is passed from the lay barge to the drilling vessel and lowered on the guide wires until it lands on the guide posts and is locked in place. The hub is to be properly aligned vertically, horizontally, and rotationally with a mating inboard hub on the production unit where the inboard hub is attached to the lines on the ocean floor. Once aligned, the hubs are connected together, and laying of the pipe bundle proceeds.

When using the pull-in connection mode, the flowline bundle with outboard hub and lines are mounted on a sled. Provision is made on the production unit for hauling the sled to the production unit. Continued hauling brings the sled to a ramp on the production unit where the sled is drawn up the ramp and landed in the correct position for mating with the inboard hub on the production unit. The hub sled is then locked into place. The Christmas tree is run and mated with the wellhead and a collet connector connects the tree to the wellhead. Making up the connection of the mating hubs then follows the procedure of the layaway mode.

Thus, in utilizing the pull-in connection mode for connecting by remote operation, flowlines and hydraulic lines for underwater production units, it is essential to insure that the flowline bundles are properly aligned vertically, horizontally, and rotationally before they are latched onto the structure of the underwater production unit. Apparatus which has previously been designed for this purpose has required the application of high pulling loads from the surface to guide the flowline bundle into and through mechanical alignment devices for proper alignment and positioning. These high loads frequently lead to mechanical failures and the remoteness of the point of generation of these loads from the point application of such loads does not permit the high degree of control necessary for final alignment operation.

Further, prior art devices have been limited in their ability to align the bundle of flowlines, hydraulic lines and electrical cables and have been unable to adjust the aligment in all directions.

Previous designs have generally employed mechanical funnels, pivotable or fixed, for alignment purposes. The incoming flowline had to be pulled, with great force, into the funnel from aboard the drilling vessel. Quite frequently the load required to be applied proved to be both insufficient to overcome mechanical obstacles and too great for the cable or the guide post of the underwater production unit resulting in breakage of the cable or bending of the posts.

Once the lines are properly positioned, various devices have been proposed for achieving the underwater connection as shown, for example, in U.S. Pat. No. 3,968,382 to Baugh, U.S. Pat. No. 4,019,334 to Sinclair et al and U.S. Pat. No. 4,086,778 to Latham et al.

The apparatus and method of the present invention overcomes the deficiencies of the prior art by providing, among other things, a hydraulic cable puller which is located on the underwater production unit at the ocean floor, a bullnose latch and bullnose for determining vertical positioning and a hydraulic alignment device for final alignment of the flowline bundle. The present invention is also equipped for severing the steel cable used for pulling the flowline bundle in the case of an emergency or at the end of a successful pull-in operation. The hydraulic alignment device overcomes the deficiencies of those prior art devices which utilized a helical surface guide inside the alignment funnel which had mechanical resistance that had to be overcome by the help of an increasing pulling force from above the sea level. The design of the present invention is such that all hydraulic equipment required for pull-in, alignment and severing the cable can then be removed to the surface, no portion of it being required to remain on bottom. Further objects and advantages of the present invention will be apparent from the following description.

SUMMARY OF THE INVENTION

The apparatus of the present invention includes a bullnose affixed to a flowline bundle carrying the flowlines, hydraulic control lines, and electrical cables from a remote location on the surface. Located on the underwater production unit at the ocean floor are a bullnose latch for engaging the bullnose, an alignment device connected to the bullnose latch by a universal joint and providing means for moving the flowline bundle horizontally and rotatably, a cable cutter, and a cable puller. A cable passes from the flowline bundle and through the bullnose, bullnose latch, alignment device, cable cutter and cable puller.

The cable puller includes static hydraulic cable grippers and dynamic hydraulic cable grippers for engaging and disengaging the cable. Hydraulic lifters raise the dynamic hydraulic cable grippers while engaging the cable for providing the pulling motion of the cable. The static hydraulic cable grippers are disengaged upon the pulling movement of the dynamic hydraulic cable grippers and are engaged upon the movement of the dynamic hydraulic cable grippers to a new pulling position.

The bullnose is mounted on the outboard hub of the flowline bundle above its center of gravity and includes an annular groove for engagement with the bullnose latch. The cable passes through the center of the bullnose and bullnose latch, causing the bullnose to be directed upwardly toward and into the bullnose latch as the cable puller pulls the cable and flowline bundle toward the production unit.

Upon substantially complete pull-in of the flowline bundle, latch jaws on the bullnose latch swing into engagement behind the annular shoulder of the bullnose. The alignment device, connected to the bullnose latch by a universal joint, can then proceed to align the flowline bundle. The alignment device includes a hydraulic cylinder and piston for horizontal movement and a rack and pinion for rotational movement of the bundle. The flowline bundle is rotated to the proper vertical height. The flowline bundle is pulled toward and inboard hub causing the bundle to swing into coaxial alignment and to be positioned a predetermined distance from the inboard hub. On proper horizontal, vertical and coaxial alignment of the flowline bundle, the outboard hub it locked down and the cable cutter is used to cut the cable.

The method of the present invention includes the cable puller pulling the bullnose and flowline bundle up the production unit ramp, onto the production unit, and into contact with the bullnose latch. The remotely operated latches of the bullnose latch then secure the flowline bundle to the alignment device. A hydraulic cylinder on the alignment device rotates the flowline bundle axially to properly vertically align the flow axes of the inboard and outboard hubs. A second hydraulic cylinder then pulls the outboard hub of the flowline bundle into coaxial and horizontal alignment to its final position opposite the inboard hub to which it is to be sealingly connected. The remotely operable cable cutter severs the cable at the end of the successful pull-in operation.

BRIEF DESCRIPTION OF THE DRAWINGS

For a detailed description of a preferred embodiment of the invention, reference will now be made to the accompanying drawings wherein:

FIG. 4 is a cross-sectional view of the alignment tool;

FIG. 5 is an elevation, partly in section, of the cable puller;

FIG. 6 is an elevation view of the cable cutter and a cross-section view of the cable puller taken along line 6—6 of FIG. 5;

DESCRIPTION OF THE PREFERRED EMBODIMENT

Figure 1:
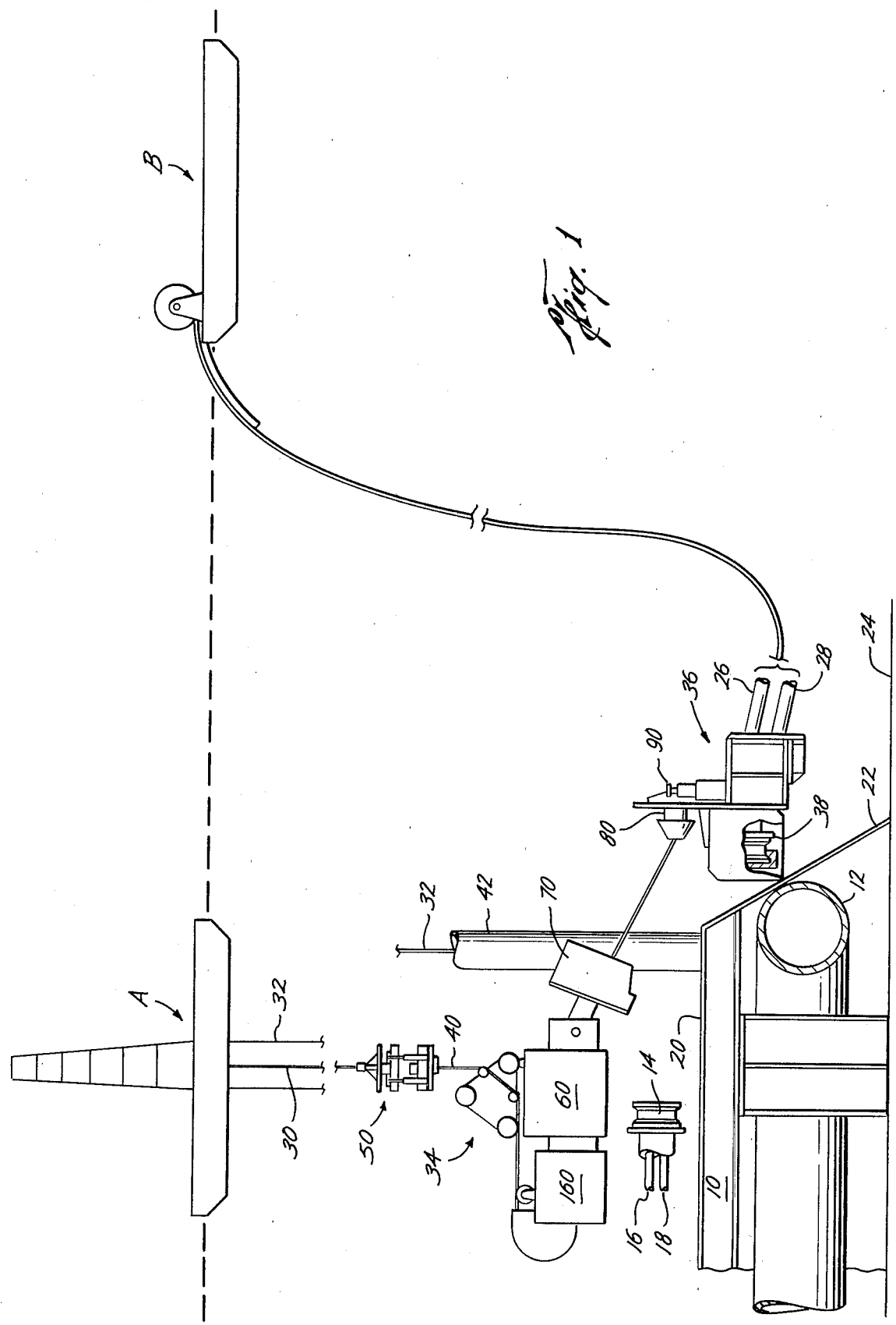
FIG. 1 is a schematic view showing the environment of the invention including a partial cut-away view of the flowline bundle.

Referring first to FIG. 1, there is illustrated a typical environment of the present invention for connecting underwater flowlines to flowlines extending to the surface. Details of the environment are described in patent applications Ser. No. 973,619 filed Dec. 27, 1978 and Ser. No. 973,895 filed Dec. 28, 1978, which are incorporated herein by reference. A portion of an underwater manifold center, shown as production unit 10, gathers oil and gas produced from one or more wells for transferring the produced oil and gas to a central location such as a surface vessel. Production unit 10, as shown in FIG. 1, may include a Christmas tree (not shown) that has been guided into position and landed on base 12 of production unit 10. One or more flowlines, such as flowlines 16, 18 for transporting the oil or gas from various wells to production unit 10, terminate at an inboard hub 14 mounted on production unit 10. The outboard portion of base 12 constitutes a porch 20 having a outwardly and downwardly sloping ramp 22 which extends over the edge of base 12 to the subsea bottom or ocean floor 24. When it becomes desirable to transport the oil and gas from a satellite well to production unit 10 or from production unit 10 to the surface, it is necessary to lay further underwater pipelines or flowlines and to connect such flowlines to inboard hub 14. The present invention includes apparatus useful in achieving such remote underwater connections.

As illustrated in FIG. 1 showing a first-end pull-in connection, a floating vessel A has drill pipe 30 and various guidelines 32 extending downwardly therefrom to underwater production unit 10. Another vessel B constitutes a pipe laying barge such as is well known in the art for laying underwater pipelines or flowlines for oil and gas. Vessel B has depending therefrom flowlines 26, 28 for mating connection to inboard flowlines 16, 18 mounted on inboard hub 14. To achieve the mating connection between inboard flowlines 16, 18 and outboard flowlines 26, 28, floating vessel A has a pull-in tool 34 (only a portion of which is shown) which is lowered onto production unit 10. Vessel B has a flowline bundle 36 attached to the ends of outboard flowlines 26, 28. Pull-in tool 34, while on vessel A, is attached to flowline bundle 36 on vessel B by a cable 40 extending between vessel A and vessel B. After pull-in tool 34 is landed on production unit 10 and locked into place as shown in FIG. 1, cable 40 extends from vessel A to production unit 10 and back to vessel B. Flowline bundle 36 is then pulled to production unit 10 by means of cable 40. FIG. 1 illustrates flowline bundle 36 being pulled up ramp 22 for disposition on top of porch 20.

Pull-in tool 34 includes a hydraulic cable puller 50, an alignment device having a power cylinder 160 and an arcuate actuator 60, and a bullnose latch 70. Flowline bundle 36 includes a bullnose 80, a lockdown mechanism 90, and outboard hub 38 connected to the ends of outboard flowlines 26, 28. Bullnose 80 is adapted to cooperate with bullnose latch 70 as cable 40 is taken up by cable puller 50 guiding flowline bundle 36 onto porch 20. The alignment device aligns outboard hub 38 with inboard hub 14 for subsequent fluid connection of the flowlines. Once flowline bundle 36 is properly aligned, it is locked into place by lockdown mechanism 90, and pull-in tool 34 and a portion of flowline bundle 36 are unsecured from production unit 10 and retrieved by vessel A. A connection tool (not shown) is subsequently lowered from vessel A to connect inboard hub 14 to outboard hub 38 by appropriate clamping and sealing means.

It should be appreciated that the environment of the present invention has been drawn to the connection of underwater flowlines and that the present invention may be used for the remote underwater connection of hydraulic control lines, electrical conduits, and other types of control lines. Further, a plurality of hubs may be mounted on production unit 10 for the connection of a plurality of different flowlines, hydraulic control lines, and electrical conduits or combinations thereof.

Figure 2:
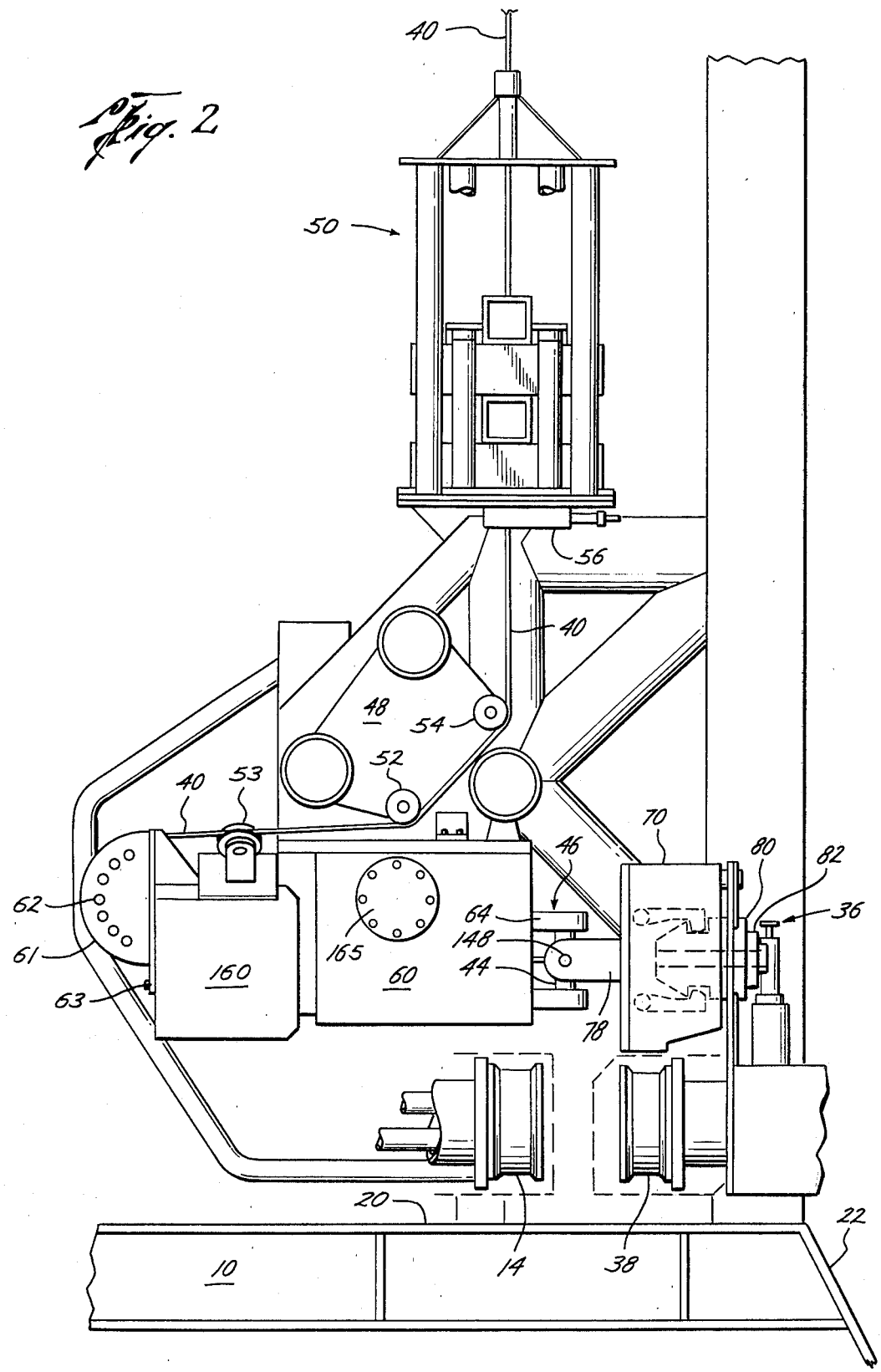
FIG. 2 is an elevation view of the present invention showing the cable puller, alignment device, universal joint, bullnose latch, bullnose and flowline bundle mounted on the porch of the production unit opposite the inboard hub.

Referring now to FIG. 2, flowline bundle 36 is shown disposed on porch 20 of production unit 10 with outboard hub 38 aligned with inboard hub 14 for connection thereto. The end of cable 40 passes through a central axial bore in bullnose 80 and is attached to a cable end terminator 82. Cable 40 passes from bullnose 80 through a central axial bore in bullnose latch 70 and through the connector ring 44 of universal joint 46. A telescoping sleeve is mounted within rotary actuator 60 to guide cable 40 through power cylinder 160 and rotary actuator 60 and over a plurality of rollers 62 mounted on the end thereof. Rollers 62 are arranged in a semi-circular fashion between the two side plates of guide assembly 61 so as to guide cable 40 through a smooth 180° turn with a minimum of resistance. Guide assembly 61 is bolted onto rear plate 63 and may be attached thereto in three different positions in a manner and for purposes to be described in more detail later on. Cable 40 then passes under pulleys 52, 54 mounted on frame 48 of pull-in tool 34 and extends through cable cutter 56 and hydraulic cable puller 50 to floating vessel A where the slack cable is collected.

Figure 3:
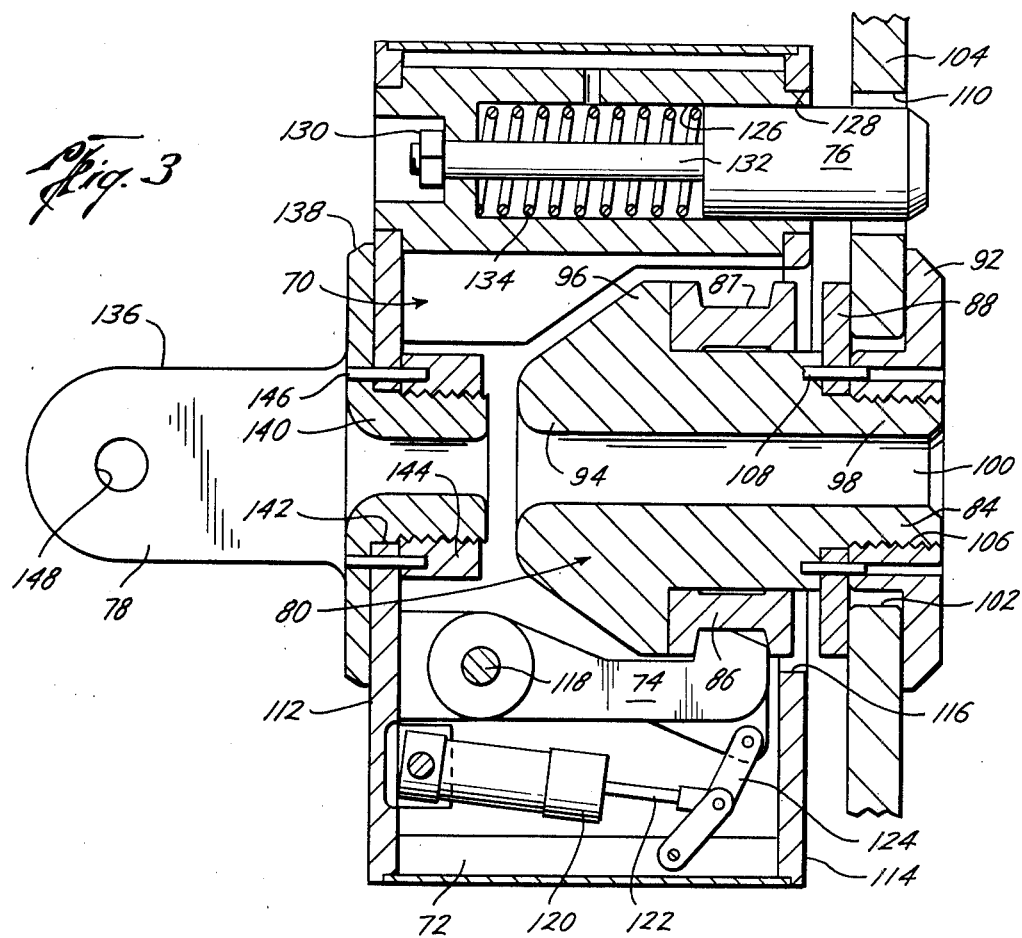
FIG. 3 is a cross-sectional view of the bullnose on the flowline bundle and the bullnose latch of the alignment tool.

FIG. 3 illustrates bullnose 80 mounted on support plate 104 of bundle 36 and engaged with bullnose latch 70. Support plate 104 includes an alignment aperture 110 for engagement with orientation pin 76 of latch 70. Bullnose 80 includes a generally cylindrical body member 84, a collar 86, a backplate 88, and a mounting plate 92. Body member 84 includes a nose 94 having the shape of a truncated cone with rounded edges to generally conform to the receptacle portion of bullnose latch 70, an annular shoulder 96 formed by nose 94, a reduced diameter portion 98, and a central axial bore 100.

Collar 86 slidingly engages the central portion of body 84 and abuts annular shoulder 96. Collar 86 includes an annular groove 87 permitting engagement with latch jaws 74 of latch 70. Backplate 88 includes a central aperture for telescoping over reduced diameter portion 98 of body member 84. Reduced diameter portion 98 is received within aperture 102 in support plate 104 and is threaded at 106 to threadingly engage plate 92. Upon tightening the threads at 106, the faces of backplate 88 and mounting plate 92 clamp supporting plate 104 to mount bullnose 80 onto flowline bundle 36. Backplate 88, mounting plate 92, and body portion 84 are held in alignment by pins 108. The distance between annular shoulder 96 and the face of backplate 88 is greater than the thickness of collar 86 thereby permitting collar 86 to adjust to the positioning of engagement with latch jaws 74.

Backplate 88 of bullnose 80, as shown in FIG. 1, is located some distance above the center of gravity of flowline bundle 36. This causes the pulling load, applied to bullnose 80, terminating at 88, to generate a righting torque around the center of gravity of flowline bundle 36. Therefore, if hub 38 approaches porch 20 in a position in which it is not aligned with the horizontal base plate of porch 20, the moment resulting from the distance between hub 38 and the terminus of cable 40 will have the desired self-righting effect upon flowline bundle 36.

Referring again to FIG. 3, bullnose latch 70 comprises a generally cylindrical housing 72, latch jaws 74, and orientation pin 76. Housing 72 includes a backplate 112 and frontplate 114 with frontplate 114 having a front opening 116 through which bullnose 80 may be received. A plurality of latch jaws 74, preferably three, are pivotally mounted at 118 in a position to be swung into engagement behind annular shoulder 96 of bullnose 80. Pivoting is accomplished by means of hydraulic cylinders 120, one of which is provided for each latch jaw 74. The piston rod 122 of hydraulic cylinder 120 is pivotally connected, as by linkage 124, to the latch jaw 74.

Orientation pin 76 is slidably received within a cylindrical sleeve 126 and projects through a hole 128 in frontplate 114 of latch 70. Orientation pin 76 is retained within sleeve 126 by means of a lock nut 130 screwed onto the end of a rod 132 projecting from orientation pin 76. A spring 134 biases orientation pin 76 to the position shown in FIG. 3, i.e. with the end of pin 76 extending beyond the face of frontplate 114. When bullnose 80 is in proper position, pin 76 is received by alignment aperture 110 in support plate 104.

Referring now to FIGS. 2 and 3, universal joint 46 includes a dual clevis 64, 78. Bullnose latch clevis 78 shown in FIG. 3 includes two clevis forks 136 disposed on an annular disc 138 with disc 138 having a generally cylindrical portion 140 protruding, coaxially from the center of disc 138 on the side opposite forks 136 and into aperture 142 in backplate 112. Cylindrical portion 140 includes exterior threads for threaded engagement with nut 144 inside bullnose latch housing 72. To maintain alignment between clevis 78 and backplate 112, pins 146 have been inserted therein. Rotary actuator clevis 64 and bullnose latch clevis 78 are connected together by trunnion 44 and pins 148 passing through apertures in the ends of double clevis 64, 78.

Referring to FIG. 4 illustrating horizontal alignment power cylinder 160 and arcuate or rotary alignment actuator 60, arcuate actuator 60 includes a rack 166, and a telescoping tubular member 168 attached to piston rod 180. Horizontal alignment power cylinder 160 includes a body portion 161 having a piston bore 170 enclosed by a cylinder head 172 attached to the end of hydraulic cylinder body 161 by fastening means such as bolts 174. O-rings 312 seal between head 172 and the body of cylinder 161. Cylinder body 161 includes a reduced diameter portion 176 for attachment to cylinder extension 178.

Portion 176 and extension 178 form a chamber for piston head 179 and piston rod 180. The length of portion 176 and extension 178 is equal to or greater than the length of the stroke of piston 162. Portion 176 and extension 178 are connected by mounts 306, 308. Mount 306 is essentially a rectangular channel with its open side pointing downwards, creating a hollow, covered space for rack 166. The sidewalls of upper mount 306 are releasably fastened, such as by bolts, to the upper ranges of portion 176 and extension 178, respectively. Mount 308, on the other hand, is generally flat and essentially flush with the lower circumferences of portion 176, bushings 184, 186 and extension 178, respectively.

Cylinder extension 178 is provided with a front plate 197, releasably fastened, such as by bolts, to provide an alignment or bearing surface against which backplate 112 of bullnose latch 70 comes to rest as clevis 64 is retracted into cylinder extension 178. In the fully retracted position, front plate 197 and backplate 112 will abut each other thus assuring proper coaxial alignment of the flow axes of inboard hub 14 and outboard hub 38 and proper positioning of outboard hub 38 a predetermined horizontal distance from inboard hub 14.

Piston rod 180 has a central axial bore through its center as shown in FIG. 4 to slidably and sealingly receive telescoping member 168 to allow the passage of cable 40 therethrough. Telescoping member 168 includes an inner sleeve 188 and outer sleeve 190. Cylinder head 172 includes a conduit for outer tubular sleeve 190 to pass the cable 40 out through the end of cylinder 160. Inner sleeve 188 includes a flanged portion 192 affixed to one end of piston rod 180 and is also supported by an annular protuberance 194 within piston rod 180. Support 194 strengthens piston rod 180 near the mounting of pinion gear 164. Outer sleeve 190 of telescoping member 168 includes a flanged portion 195 attached to cylinder head 172. O-rings 314 provide a seal between sleeve 190 and head 172. Outer sleeve 190 extends into the bore of piston rod 180 and telescopically receives the free end of inner member 188.

Piston rod 180 protrudes into piston bore 170 for threading engagement with piston head 179. Piston head 179 has a pin 310 at the point of threaded engagement between head 179 and rod 180. Clevis 64 is mounted on the opposite end of piston rod 180.

Piston rod 180 sealingly engages, by means of O-rings at 196, cylinder extension 178 and by means of O-rings at 198 reduced diameter portion 176. O-rings 300 create a seal between piston rod 180 and the exterior of outer sleeve 190. O-rings 302 cause sealing engagement between piston 162 and the inner surface of cylinder body 161. An annular stop ring 304 is bolted to the bottom of piston bore 170 to limit the stroke of piston 162 within cylinder housing 161.

Figure 4A:
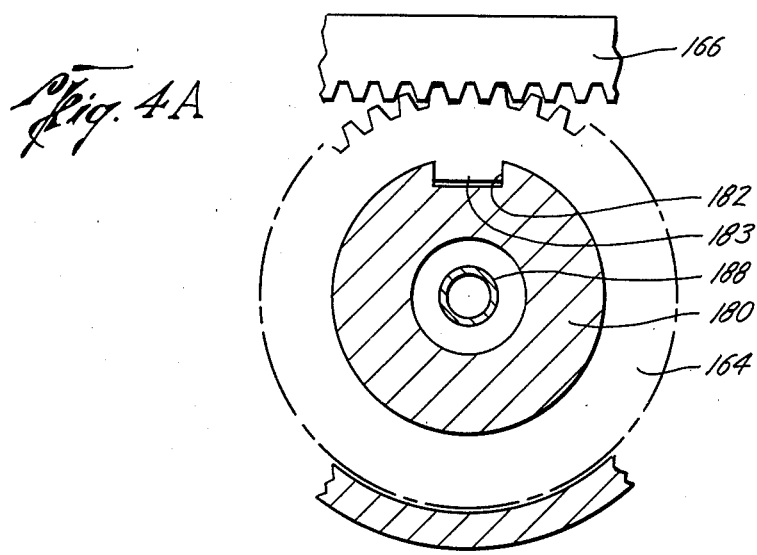
FIG. 4A is a cross-sectional view of the rack and pinion gear of the alignment tool taken along line 4A of FIG. 4.

Referring to FIG. 4A illustrating the rack and pinion gear of arcuate actuator 60, rack 166 is mounted above reduced diameter portion 176 and cylinder extension 178 and inside the opening defined by upper mount 306. The clevis end portion of piston rod 180 includes a key slot 182 for sliding engagement with key 183 of pinion gear 164. Pinion gear 164 is mounted on piston rod 180 between portion 176 and cylinder extension 178 by means of key 183 and slot 182 and between bushings 184, 186 to permit rotation therebetween. Rack 166 is mounted in such a fashion that its teeth intermesh with the teeth of pinion gear 164. Rack 166 is driven by a hydraulic cylinders 165 (shown in FIG. 2) mounted outside the main body of rotary actuator 60. When actuated, hydraulic cylinders 165 are capable of laterally moving rack 166 in either direction, resulting in a corresponding clockwise or counterclockwise rotation, respectively, of piston rod 180 as well as inner sleeve 188 of telescoping member 168. This rack, gear, and cylinder combination are capable of rotating piston rod 180 and therefore latch 70, a total of in excess of 360°, i.e. at least 180° in each direction from the central position depicted in the drawings. Thus the outboard hub 38 may be pivoted through an arc intersecting the flow axis of inboard hub 14 for proper vertical alignment of the flow axes of hubs 14, 38.

Referring again to FIG. 2, two additional pulleys 53 (only one of which is visible in FIG. 2) are mounted on the exterior of cylinder 160 of rotary actuator 60 in an inclined position, deviating between 40°-60°, preferably at approximately a 48° angle, from the vertical position. The entire assembly 61 of cable guide rollers 62 may be unbolted from arcuate actuator rear plate 63 and tilted from its vertical position to either side at precisely the same angle of inclination as either one of pulleys 53. When bolted onto plate 63 in this skew fashion, it is possible to use cable puller 50 and arcuate actuator 60 to pull and align a second or more flowline bundles onto porch 20 of base 10. Thus, two different flowline bundles may be mounted side by side on the same porch 20 of production unit 10, each one being off-center with respect to cable puller 50 mounted centrally atop frame 48 of pull-in tool 34.

For pulling in the second flowline bundle, pull-in tool 34 is retrieved, guide roller assembly 61 remounted in the oppositely inclined position on plate 63 and arcuate actuator 60 is brought down to a position off-center with respect to cable puller 50 but in-line with the second inboard hub mounted on porch 20 of base 10. Thus, again, by properly guiding cable 40 over rollers 62 and pulley 53 an off-center flowline bundle may be pulled in without moving cable puller 50.

Referring now to FIGS. 5 and 6, cable puller 50 is mounted on frame 48 of pull-in tool 34 (shown in FIG. 2) for pulling flowline bundle 36 from vessel B to production unit 10 by means of cable 40. As cable 40 is gathered by cable puller 50, the excess cable is collected at vessel A.

Cable puller 50 includes two lower and two upper static hydraulic cable grippers, 200, 202, two lower and two upper dynamic hydraulic cable grippers 204, 206 four hydraulic lifters 220, and a mounting frame 210. Frame 210 includes base plates 232, 234 having eight vertical supports 230 attached thereto and a top plate 218 bolted to the upper ends of vertical supports 230.

Lower static cable grippers 200, are housed in lower gripper frame 201 facing each other in one common plane. Lower gripper frame 201 is fixedly attached to socket plate 236 disposed on top of lower mounting plate 234. Upper static cable grippers 202 are also positioned facing one another but are housed in upper gripper frame 203 which in turn is fixedly attached, e.g., by welding, to the top plate of lower gripper frame 201 so that frame 201 is at right angles to frame 203. Similarly, lower dynamic cable gripper 204, and upper dynamic cable grippers 206 are housed within lower dynamic cable gripper frame 211 and upper dynamic cable gripper frame 213, respectively, which are arranged one on top of the other at right angles.

Each hydraulic lifter 220 includes a piston 226 housed within cylinder 224 and is connected to piston rod 222. The lower end of cylinder 224 is bolted to lower mounting plate 234. The upper end of piston rod 222 is attached to dynamic lifter plate 238 which is fixedly attached to lower and upper dynamic grabber housings 211 and 213, respectively.

Referring now to FIGS. 5 and 6, illustrating lower dynamic cable grippers 204, as typical cable grippers, gripper 204 includes a piston 207, connected to piston rod 209 having a cable latch jaw 221 mounted on the end opposite piston 207. Latch jaw 221 is of a generally rectangular dimension and is provided with a semi-circular engagement groove 225 along its vertical center line. Groove 225 has a diameter slightly less than the diameter of pull-in cable 40.

Upon actuation of lower dynamic grippers 204 the front faces of latch jaws 221 move simultaneously toward the center of plate 238 so as to encapsulate cable 40 between latch grooves 225. Upper hydraulic cable grippers 206 being of identical construction, move in a similar fashion to encapsulate cable 40 at right angles to jaws 221. Static cable grippers 200 and 202 are constructed and operate in a manner substantially the same as the dynamic cable grippers 204 just described.

The operation, initially, hydraulic lifters 220 will be in the retracted position so that dynamic cable grippers 204, 206 will be resting right above upper static gripper frame 203. In that position static grippers 200, 202 will first be in the extended, load-applying phase, thus holding cable 40 locked in place. In order to start or to continue the pull-in process, dynamic grippers 204, 206 are actuated so as to also secure cable 40 between the semicircular grooves 225 along the gripper jaws 221. Thereupon, the pistons and gripper jaws of static cable grippers 200, 202 are retracted, releasing cable 40. Cable 40 and with it flowline bundle 36 are prevented from slipping, however, since the latch jaws of dynamic cable grippers 204, 206 are in the extended and grabbing position. Hydraulic lifters 220 are then actuated with piston 226 moving upward within cylinder 224 and moving with it dynamic lifter plate 238 and dynamic grippers 204, 206 attached thereto. Once hydraulic lifters 220 have reached their fully extended, upward position (as shown in FIG. 5), static cable grippers 200, 202 are locked again so as to secure cable 40 in its then advanced stage. Thereupon dynamic grippers 204, 206 are actuated to release their hold on cable 40, thus permitting hydraulic lifters 220 to be retracted to their lowermost or starting position. Through repetitions of this cycle, cable 40 will intermittently be held in place and advanced upwardly, pulling flowline bundle 36 towards and onto porch 20.

Figure 7:
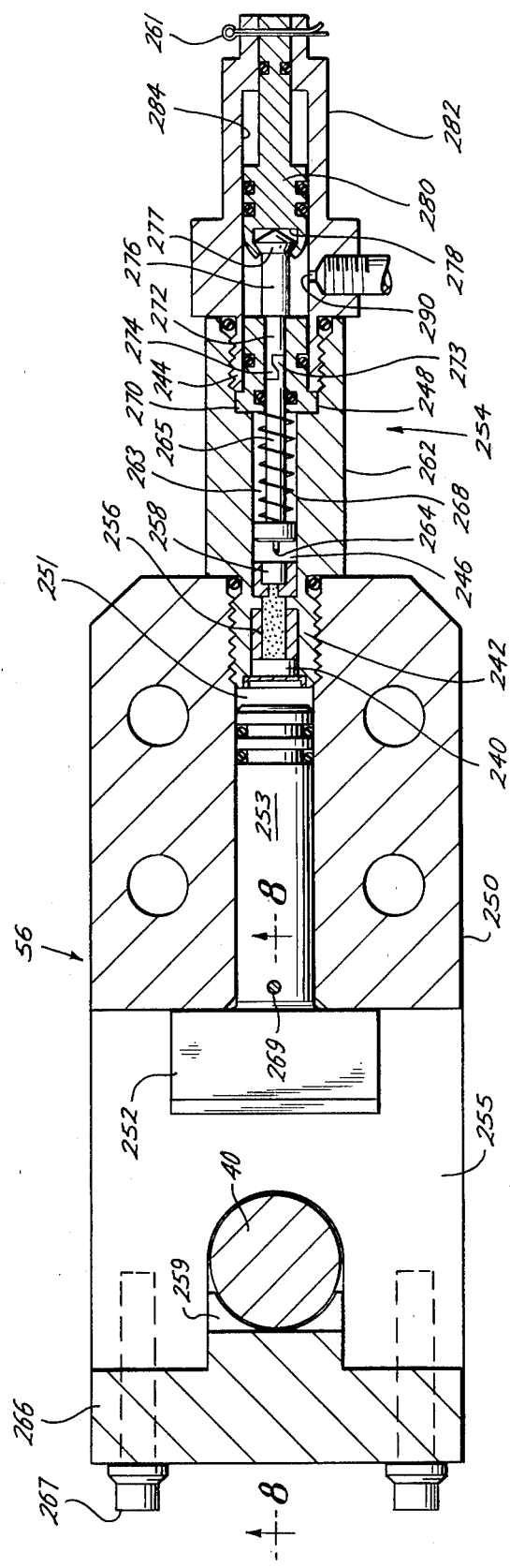
FIG. 7 is a cross-sectional view of the cable cutter taken along line 7—7 of FIG. 6.

Referring now to FIGS. 2 and 7, cable cutter 56 is disposed below hydraulic cable puller 50 on pull-in tool 34.

Figure 8:
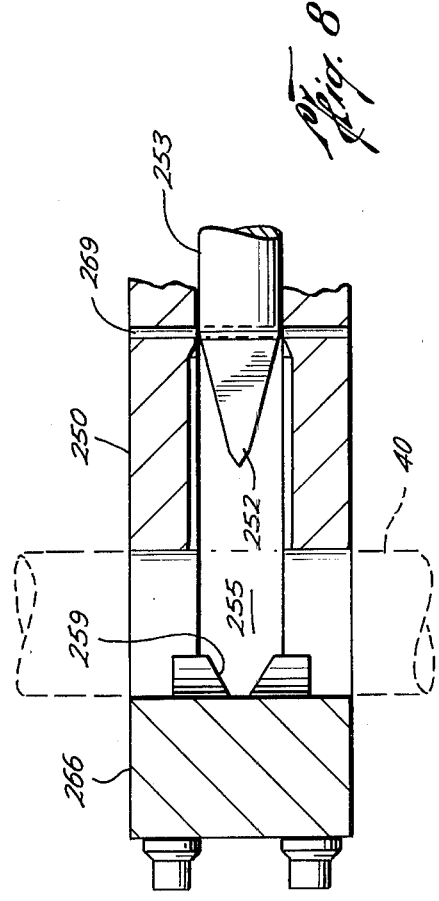
FIG. 8 is a cross-sectional view of the cable cutter taken along line 8—8 of FIG. 7.

Referring now to FIGS. 7 and 8, cable cutter 56 is shown to include a housing 250, blade 252, and firing assembly 254. Housing 250 includes bore 251 transverse to the axis of cable 40. Blade 252 is mounted on one end of a shaft 253 which is received by bore 251. Blade 252 is held in position within housing 250 by a shear pin 269. As shown in both FIGS. 7 and 8, housing 250 includes a slot 255 for blade 252 and an anvil 266 bolted onto housing 250 with bolts 267, anvil 266 having a tranverse slot 259 for cable 40.

Referring again to FIG. 7, firing assembly 254 includes firing pin assembly housing 262 and firing pin pneumatic piston housing 282. A reduced diameter portion 242 of housing 262 is threadingly received by central axial bore 251. Housing 282 similarly possesses a reduced diameter portion 244 threadedly received by firing pin assembly housing 262. Portion 242 of firing pin assembly housing 262 is provided with a central axial bore 240 for receiving propellant capsule 256. Firing pin assembly housing 262 is also provided with a central axial bore 246 which houses firing piston 263. At the end of bore 246 closest to axial bore 240 (which is connected with bore 246), bore 246 houses percussion primer capsule 258. Firing piston 263 is provided with firing pin 264 at one end and at its other end includes a firing pin rod 265.

A stop plug 270 is inserted into an enlarged portion 248 of the central axial bore 246 of firing pin assembly housing 262 and held in place by reduced diameter portion 244 of pneumatic piston housing 282. Central axial bore 246 also extends through plug 270 and firing pin rod 265 is then able to slidably extend through plug 270 as well. A spring 268, abutting stop plug 270, is received within the space between firing pin rod 265 and the walls of the central axial bore 246 through pin assembly housing 262. Spring 268 is a compression spring which, in its rest position, biases firing pin 264 against percussion primer capsule 258 but strikes percussion primer capsule 258 only after having been compressed and after the release of piston 263.

A key 273 at the end of firing pin rod 265 engages a similar key 274 at the end of the retainer rod 272. Retainer rod 272, at its other end, is provided with an enlarged base portion 276 terminating in base cone 277. Hydraulic piston 280, slidably received within hydraulic fluid bore 284, is equipped with a retainer bore 278 at one end, the sidewalls of which fittingly engage the enlarged base portion 277 of retainer rod 272.

When hydraulic fluid chamber 284 is pressurized through the introduction of hydraulic fluid via fluid bore 290, piston 280, after shearing shear pin 261, will move to the right, away from stop plug 270, and thereby move firing pin 264 to the right against the resistance of spring 268. When firing pin rod 265 has been pulled far enough to the right, i.e., to the point where key 273 extends beyond stop plug 270 into hydraulic fluid bore 284, retainer rod 272, being able to pivot on the apex of cone 277 within piston bore 278, will be pushed upwardly, thereby releasing key 273 from its interlock with key 274. Thereupon, recoiling spring 268 will drive firing pin 264 with great force into percussion primer capsule 258. Percussion primer 258, in turn, sets off propellant 256 which, in expanding within cylinder 251, after shearing shear pin 269, drives cutting blade 252 into anvil 266, thereby severing cable 40 retained within transverse slot 257.

In operation, cable puller 50 moves cable 40 upwardly until flowline bundle 36, to which cable 40 is attached, is landed on base 20. To that end, dynamic cable grippers 204, 206 of cable puller 50 engage cable 40, while static cable gripper 200, 202 release their hold on cable 40. Thereupon, hydraulic lifters 220 push dynamic cable grippers 204, 206 upward, lifting up cable 40 held between them as well. With hydraulic lifters 220 fully extended and in their uppermost position, static grippers 200, 202 are actuated to engage cable 40, while dynamic grippers 204, 206 are retracted to release their hold on cable 40. Cable 40 being held in place by static grippers 200, 202, hydraulic lifter 220 are retracted to their lowermost position and dynamic grippers 204, 206 reactivated to engage cable 40 again, thus completing the cycle.

In this intermittent fashion, cable puller 50 pulls flowline bundle 36 toward production unit 10, up ramp 22, and lands it on base 20. During this last phase of the pull-in process a self-righting moment, brought about by the spatial separation between the terminus of the pull-in force on flowline bundle 36, i.e., bullnose 80, and the center of gravity of flowline bundle 36, i.e., outboard hub 38, assures that flowline bundle 36, in bearing against ramp 22 on its way up to the base, is landed in a generally upright position on base 20. After the landing on the base of flowline bundle 36, final alignment must be established to assure proper vertical, coaxial and horizontal alignment between inboard hub 14 and outboard hub 38. Vertical and coaxial alignment must be achieved between the flow axes or cable terminals of all conduits carried by these hubs at the hub interfaces. Ramp 22 facilitates self-righting of the flowline bundle 36 and positioning of outboard hub 38 on the same general vertical plane as inboard hub 14. Since outboard hub 38 may, however, still be in a cocked position at that point, final vertical alignment between the flowline axes of inboard hub 14 and outboard hub 38 is carried out by means of arcuate alignment actuator 60 rotating flowline bundle 36 in such a fashion that the center lines of piston rod 180 and bullnose 80 are in the same vertical plane and the central or flow axes of flowlines 26, 28 and 16, 18 are in precisely the same vertical plane. These axes may, however, not be coaxially aligned at that point. Coaxial alignment will be achieved by retracting piston rod 180, thereby bringing plates 112 and 197 to bear against each other until they are parallel and flush with one another and, at the same time, positioning outboard hub 38 and inboard hub 14 a certain horizontal distance apart for flow-communicating connection.

Final alignment, then, is accomplished in a three-step fashion. First, after securing bullnose 80 by means of latch jaws 74, the arcuate alignment actuator 60 is employed to move rack 166 such that, with the help of pinion gear 164, latch 70 is rotated in a clockwise or counterclockwise fashion, whichever may be required for final vertical alignment of flowline bundle 36 where the vertical height of the flow axis of outboard hub 38 is the same as that of the flow axis of inboard hub 14. Secondly, hydraulic cylinder 160 is actuated to retract clevis 64 into cylinder extension 178 where the bearing surface on front plate 197 swings outboard hub 38 into coaxial alignment with inboard hub 14. Lastly, but simultaneously with the coaxial alignment, the retraction of piston rod 180 pulls flowline bundle 36 forward to its final horizontal lock-in position on base 20 at a predetermined horizontal distance from hub 14. When alignment is completed, latch jaws 74 release bullnose 80 so that latch jaws rotary actuator 60 is no longer connected to bullnose 80 and flowline bundle 36. Bullnose 80 is subsequently detached from flowline bundle 36 and retrieved to the surface after outboard hub 38 finally locked onto base 20.

Once pull-in and alignment operations are completed, cable cutter 56 is actuated to sever cable 40. Thereupon, the entire pull-in and alignment tool, comprising cable puller 50, cable cutter 56, power cylinder 160, and rotary actuator 60, may be removed to the surface.

The procedure just described may also be used on porches with more than one flowline bundle side by side. By changing the angle of inclination of guide roller assembly 61 with respect to rotary actuator rear plate 63, cable 40 can be rerouted over sheaves 53 so as to permit pulling in more than one outboard hub with the help of one centrally positioned cable puller 50.

Although this invention has been described primarily in terms of the connection of a flow line hub to a hub on an underwater production unit, the same apparatus and method may be used for connection of electrical cables and hydraulic control lines, as previously indicated. Such modifications as may be necessary to achieve such connections will be apparent to those skilled in the art.

Various other embodiments and modifications will also be apparent from the foregoing description. The invention is therefore not limited to the specific embodiments disclosed, but extends to every embodiment within the scope of the appended claims.

We claim:

1. An apparatus for pulling a first subsea conduit to a second subsea conduit and for aligning the first subsea conduit with the second subsea conduit, comprising:
    pulling means disposed on the subsea floor for pulling the first subsea conduit to the second subsea conduit;
    cable means attached to the first subsea conduit and extending to said pulling means, said pulling means being actuated into engagement with said cable means at its location on the subsea floor for applying pulling force on said cable means at such location; and
    alignment means disposed adjacent to the second subsea conduit for aligning the first subsea conduit with the second subsea conduit.

2. An apparatus according to claim 1 further including cutter means for severing said cable means at the subsea floor.

3. An apparatus according to claim 2 wherein said cutter means is actuated hydraulically.

4. An apparatus for pulling a first subsea conduit to a second subsea conduit and for aligning the first subsea conduit with the second subsea conduit, comprising:
    pulling means disposed on the subsea floor for pulling the first subsea conduit to the second subsea conduit;
    cable means attached to the first subsea conduit and extending to said pulling means; and
    alignment means disposed adjacent to the second subsea conduit for aligning the first subsea conduit with the second subsea conduit, said alignment means including-
    vertical alignment means for positioning the flow axis of the first subsea conduit at the same vertical height as the flow axis of the second subsea conduit;

coaxial alignment means for causing the flow axis of the first subsea conduit to be coaxial with the flow axis of the second subsea conduit; and horizontal alignment means for positioning the first subsea conduit a predetermined horizontal distance from the second subsea conduit.

5. An apparatus according to claim 4 further including a first connector disposed on the first subsea conduit and a second connector disposed on the second subsea conduit; said vertical alignment means positioning said first connector and second connector an equal distance from the flow axis of the second subsea conduit.

6. An apparatus according to claim 4 wherein said cable means includes a line which passes through said vertical alignment means, said coaxial alignment means, said horizontal alignment means, and said pulling means.

7. An apparatus according to claim 4 wherein said vertical alignment means includes ramp means for guiding the first subsea conduit from the subsea floor up towards the second subsea conduit.

8. An apparatus according to claim 4 wherein said vertical alignment means includes probe means disposed above the first subsea conduit and receiving means disposed above the second subsea conduit for receiving said probe means.

9. An apparatus according to claim 4 wherein said coaxial alignment means include joint means for connecting the first subsea conduit to the second subsea conduit permitting 360° hinged movement therebetween and bearing means for causing the first subsea conduit to move into coaxial alignment with the second subsea conduit.

10. An apparatus according to claim 8 further including connection means for connecting said probe means and said receiving means.

11. An apparatus according to claim 10 wherein said connection means includes shoulder means and latch means; said latch means engaging said shoulder means upon connecting said probe means to said receiving means.

12. An apparatus according to claim 11 wherein said connection means includes lost motion means for adjusting the position of engagement between said shoulder means and said latch means.

13. An apparatus according to claim 8 further including orientation means for orienting said probe means with said receiving means.

14. An apparatus according to claim 4 wherein said horizontal alignment means and coaxial alignment means include motor means for moving the first subsea conduit in a direction horizontal to the subsea floor and toward the second subsea conduit.

15. An apparatus according to claim 14 wherein said motor means includes
piston means for moving the first subsea conduit in the horizontal direction,
cylinder means for housing a portion of said piston means, and
hydraulic means for moving said portion within said cylinder means.

16. An apparatus according to claim 15 further including telescoping means disposed within said piston means and said cylinder means for housing a portion of said cable means.

17. An apparatus according to claim 4 wherein said vertical alignment means includes arcuate means for pivoting the first subsea conduit through an arc intersecting the flow axis of the second subsea conduit.

18. An apparatus according to claim 17 wherein said arcuate means includes pinion means mounted on pivot means connected at one end with the first subsea conduit, rack means engaging said pinion means, and hydraulic means for reciprocating said rack means.

19. An apparatus according to claim 15 wherein said vertical alignment means includes turning means for rotating said piston means.

20. An apparatus according to claim 19 wherein said piston means is adapted to reciprocate with respect to said turning means.

21. An apparatus according to claim 6 further including guidance means for guiding said cable means from said alignment means to said pulling means.

22. An apparatus according to claim 21 wherein said guidance means includes adjustment means for changing the direction of said cable means from said alignment means to said pulling means.

23. An apparatus for pulling a first subsea conduit to a second subsea conduit and for aligning the first subsea conduit with the second subsea conduit, comprising:
pulling means disposed on the subsea floor for pulling the first subsea conduit to the second subsea conduit;
cable means attached to the first subsea conduit and extending to said pulling means; and
alignment means disposed adjacent to the second subsea conduit for aligning the first subsea conduit with the second subsea conduit, wherein said pulling means includes
static engagement means for engaging and disengaging said cable means;
dynamic engagement means for engaging and disengaging said cable means;
lift means for reciprocating said dynamic engagement means between an extended position and a retracted position;
said dynamic engagement means engaging said cable means and said static engagement means disengaging said cable means when said lift means moves said dynamic engagement means from said retracted position to said extended position; and
said static engagement means engaging said cable means and said dynamic engagement means disengaging said cable means when said lift means moves said dynamic engagement means from said extended position to said retracted position.

24. An apparatus according to claim 22 wherein each of said static and dynamic engagement means includes an upper and a lower gripper means positioned one above the other and at right angles to each other to encapsulate said cable means in the engaging position; each of said upper and lower gripper means including jaw means actuated by actuator means.

25. A subsea apparatus for pulling a sub-sea conduit connected to a cable comprising:
static engagement means for engaging and disengaging said cable;
dynamic engagement means for engaging and disengaging said cable;
lift means for reciprocating said dynamic engagement means between a first position and a second position with respect to said static engagement means;

said dynamic engagement means engaging said cable and said static engagement means disengaging said cable when said lift means moves said dynamic engagement means from said first position to said second position; and said static engagement means engaging said cable and said dynamic engagement means disengaging said cable when said lift means moves said dynamic engagement means from said second position to said first position.

26. An apparatus according to claim 25 further including cutter means for remotely severing said cable.

27. An apparatus according to claim 26 wherein said cutter means includes actuator means for hydraulically actuating said severing of said cable.

28. An apparatus according to claim 25 further including actuator means for actuating said static and dynamic engagement means and said static and dynamic engagement means further including jaw means for gripping the cable.

29. An apparatus according to claim 28 wherein each of said jaw means includes piston means attached to said actuator means; each of said piston means including an engagement plate having a groove of a diameter smaller than the diameter of said cable for receiving a portion of said cable.

30. An apparatus according to claim 29 wherein said pulling means includes first plates and second plates having spacer members therebetween; said cable passing through apertures in said plates.

31. A subsea apparatus for aligning a first subsea conduit connected by a cable with a second subsea conduit, comprising:

vertical alignment means for positioning the flow axis of the first subsea conduit at the same vertical height as the flow axis of the second subsea conduit, said vertical alignment means including probe means disposed above the first subsea conduit and receiving means disposed above the second subsea conduit for receiving said probe means, and including arcuate means for pivoting the first subsea conduit through an arc intersecting the flow axis of the second subsea conduit;

coaxial alignment means for causing the flow axis of the first subsea conduit to be coaxial with the flow axis of the second subsea conduit, said coaxial alignment means including joint means for connecting the first subsea conduit to the second subsea conduit permitting approximately 180 degree hinged movement therebetween in clockwise and counterclockwise directions, and bearing means including flat plates attached to the first and second subsea conduits for flush, abutting interengagement with each other for causing the first subsea conduit to move into coaxial alignment with the second subsea conduit; and horizontal alignment means for positioning the first subsea conduit a predetermined horizontal distance from the second subsea conduit.

32. An apparatus for aligning a first subsea conduit with a second subsea conduit, comprising:
probe means disposed above the first subsea conduit for locking onto the second subsea conduit;
receiving means disposed above the second subsea conduit for receiving said probe means;
a cable attached to said probe means and passing through said receiving means;
ramp means for guiding the first subsea conduit towards the second subsea conduit; and
pulling means operating on said cable for pulling the first subsea conduit to said ramp means and towards the second subsea conduit.

33. An apparatus for aligning a first subsea conduit with a second subsea conduit, comprising:
probe means disposed above the first subsea conduit for locking onto the second subsea conduit;
receiving means disposed above the second subsea conduit for receiving said probe means;
horizontal alignment means for positioning the first subsea conduit a predetermined horizontal distance from the second subsea conduit; and
vertical alignment means for positioning the flow axis of the first subsea conduit at the same vertical height as the flow-axis of the second subsea conduit.

34. An apparatus for aligning a first subsea conduit with a second subsea conduit, comprising:
probe means disposed above the first subsea conduit for locking onto the second subsea conduit;
receiving means disposed above the second subsea conduit for receiving said probe means; and
arcuate alignment means for pivoting the first subsea conduit through an arc intersecting the flow axis of the second subsea conduit for positioning the flow axes of the first and second subsea conduits on the same vertical plane.

35. An apparatus for aligning a first subsea conduit with a second subsea conduit, comprising:
a member including the first subsea conduit mounted thereon, said member having a top portion and a bottom portion;
cable means attached to said member above the center of gravity of said member;
pulling means located adjacent the second subsea conduit for operating on said cable means to pull said member toward the second subsea conduit;
bearing means associated with the second subsea conduit for bearing against said member as said member approaches the second subsea conduit; and
self-righting means for causing the first subsea conduit to be disposed in an upright configuration with its top portion uppermost at a predetermined position with respect to the second subsea conduit.

36. A method for aligning a first subsea conduit with a second subsea conduit, comprising:
pulling from adjacent the second subsea conduit the first subsea conduit by cable toward the second subsea conduit;
connecting a probe disposed above the first subsea conduit to an alignment device above the second subsea conduit;
rotating the first subsea conduit until the flow axes of the first and second subsea conduits are at the same vertical height;
swinging the first subsea conduit into coaxial alignment with the second subsea conduit;
pulling the first subsea conduit toward the second subsea conduit to a predetermined horizontal position; and
severing the cable near the second subsea conduit.

* * * * *